3,775,442
PROCESS FOR THE MANUFACTURE OF A
TRIARYLMETHANE COMPOUND
Nigel Hughes, Manchester, England, assignor to Imperial
Chemical Industries Limited, London, England
No Drawing. Filed July 29, 1971, Ser. No. 167,439
Claims priority, application Great Britain, Aug. 27, 1970,
41,242/70
Int. Cl. C09b 11/10
U.S. Cl. 260—391    3 Claims

ABSTRACT OF THE DISCLOSURE

A process for the manufacture of a triaminotriarylmethane comprising reacting a diaminobenzhydrol such as Michler's hydrol with an optionally substituted aromatic secondary or tertiary amine in the presence of phosphoric acid.

---

This invention relates to a chemical process and more particularly to a process for the manufacture of compounds of the triarylmethane series.

According to the invention there is provided a process for the manufacture of a triarylmethane compound having the general formula:

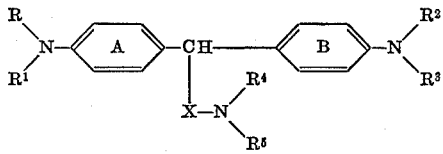

wherein R and $R^2$ each independently represents an optionally substituted alkyl radical, $R^1$, $R^3$ and $R^4$ each independently represents an optionally substituted alkyl or aryl radical, $R_5$ represents a hydrogen atom or an optionally substituted alkyl radical, X represents a 1,4-arylene residue which may optionally be substituted and rings A and B may optionally be further substituted, said process comprising reacting a benzhydrol of the formula:

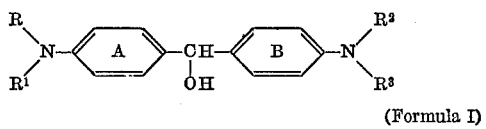

(Formula I)

wherein R, $R^1$, $R^2$, $R^3$ and rings A and B have the significances stated above, with an amine of the formula:

(Formula II)

wherein $R^4$, $R^5$ and X have the meanings stated above, in the presence of an effective amount of phosphoric acid.

The substituents R, $R^1$, $R^2$, $R^3$, $R^4$ and $R^5$ are most preferably methyl or ethyl radicals. Other substituents which may be present in rings A and B include alkyl, alkoxy and halogen but it is preferred that said rings are unsubstituted. X may be an optionally substituted 1,4-naphthylene residue but is preferably an optionally substituted 1,4-phenylene residue. In addition to the —$NR^4R^5$ group other substituents which may be present on X include carboxy, sulpho, carboalkoxy, optionally substituted alkyl, carbamoyl, cyano, nitro, hydroxy, acyloxy, acyl and halogen.

Compounds of Formula I which may be used in the process of the invention include 4,4'-bis(dimethylamino) benzhydrol commonly known as Michler's hydrol. Examples of suitable amines of Formula II include N,N-dimethylaniline, m-dimethylaminobenzene sulphonic acid, m-dimethylaminobenzoic acid, methyl m-dimethylamino benzoate, m-dimethylaminobenzonitrile, 3 - carboxy-N-ethyl-α-naphthylamine and N-phenyl-α-naphthylamine.

Suitable amounts of phosphoric acid for use in the process of the invention are usually in the range of from 100% to 1000% by weight based on the weight of reactants. The reaction may conveniently be carried out at temperatures between 50° C. and 150° C. The process of the invention provides excellent yields of the triarylmethane compound. When the amine of Formula II is a relatively unreactive one the yields are much superior to those obtained in prior art processes where condensing agents other than phosphoric acid are used. This is particularly the case when the 1,4-arylene residue represented by X carries one or more electron-withdrawing substituents. Examples of such substituents include —CN, —$COOR^6$ and —$CONR^7R^8$ wherein $R^6$, $R^7$ and $R^8$ each represent hydrogen or optionally substituted lower alkyl.

The triarylmethane compounds obtained according to the process of the invention are leuco bases of triarylmethane dyes and may be converted into the said dyes by conventional methods.

The invention is illustrated but not limited by the following examples in which all parts and percentages are by weight:

EXAMPLE 1 m-Dimethylaminobenzoic acid (9.1 parts) and 4,4'-bis (dimethylamino)benzhydrol (13.5 parts) are added to stirred 80% phosphoric acid (75 parts) and the mixture is heated at 120° C. for 8 hours. The mixture is cooled to 50° C., diluted with water (500 parts) and the pH of the resultant solution is raised to 5.0 by addition of sodium hydroxide solution. The precipitated solid is collected by filtration, washed with water and dried in air. 19.0 parts of 2-[4,4'-bis(dimethylamino)benzhydryl]-5-dimethylaminobenzoic acid having a melting point of 200° C. are thus obtained.

Similarly, by condensing the compounds given in columns A and B of the following table, under the same reaction conditions, the products given in column C are obtained.

| Example | A | B | C |
|---|---|---|---|
| 2 | 4,4'-bis(dimethylamino)benzhydrol | m-Diethylaminobenzoic acid | 2-[4,4'-bis(dimethylamino)benzhydryl]-5-diethylaminobenzoic acid. |
| 3 | do | m-Dimethylaminobenzonitrile | 2-[4,4'-bis(dimethylamino)benzhydryl]-5-dimethylaminobenzonitrile. |
| 4 | do | Ethyl m-dimethylaminobenzoate | Ethyl-2-[4,4'-bis(dimethylamino)benzhydryl]-5-dimethylaminobenzoate. |
| 5 | do | m-Dimethylaminobenzamide | 2-[4,4'-bis(dimethylamino)benzhydryl]-5-dimethylaminobenzamide. |
| 6 | do | 4-(N-ethylamino)-2-naphthoic acid | 1-[4,4'-bis(dimethylamino)benzhydryl]-2-carboxy-4-(N-ethylamino)-naphthalene. |
| 7 | 4,4'-bis(dimethylamino)benzhydrol | m-Diethylaminobenzoic acid | 2-[4,4'-bis(diethylamino)benzhydryl]-5-diethylaminobenzoic acid. |
| 8 | 4,4'-bis(dimethylamino)-2,2'-dichlorobenzhydrol | m-Dimethylaminobenzoic acid | 2-[4,4'-bis-(dimethylamino)-2,2'-dichlorobenzhydryl]-5-dimethylaminobenzoic acid. |
| 9 | 4,4'-bis(dimethylamino)-2,2'-dimethylbenzhydrol | do | 2-[4,4'-bis(dimethylamino)-2,2'-dimethylbenzhydryl]-5-dimethylaminobenzoic acid. |
| 10 | 4,4'-bis(dimethylamino)-2,2'-dimethoxybenzhydrol | do | 2-[4,4'-bis(dimethylamino)-2,2'-dimethoxybenzhydryl]-5-dimethylaminobenzoic acid. |

I claim:
1. In a process for the manufacture of a triarylmethane compound having the general formula:

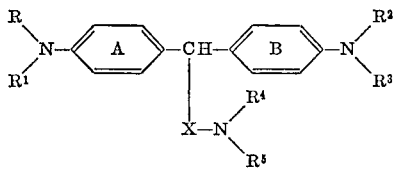

wherein R, $R^1$, $R^2$, $R^3$ and $R^4$ each independently represents methyl or ethyl, $R^5$ represents hydrogen, methyl or ethyl, X represents a 1,4-phenylene or 1,4-naphthylene residue carrying an electron-withdrawing substituent and rings A and B may optionally be substituted by halogen, lower alkyl or lower alkoxy by reacting a benzhydrol of the formula:

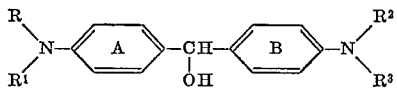

with an amine of the formula:

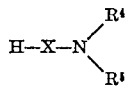

in the presence of a condensing agent, the improvement which comprises carrying out said reaction at 50° C. to 150° C. using an effective amount of phosphoric acid as the condensing agent, the amount of phosphoric acid being from 100% to 1000% by weight based on the weight of benzhydrol and amine.

2. A process as claimed in claim 1 wherein X carries a cyano, carboxy, carbethoxy or carbamoyl radical.

3. A process as claimed in claim 1 wherein 4,4'-bis(dimethylamino)benzhydrol is reacted with m-dimethylaminobenzoic acid.

References Cited
UNITED STATES PATENTS 2,417,897    3/1947    Adams ............ 260—391
3,121,115    2/1964    Meuly ............ 260—391

LORRAINE A. WEINBERGER, Primary Examiner

L. A. THAXTON, Assistant Examiner

U.S. Cl. X.R.

260—388